US012492576B2

(12) United States Patent
Huang et al.

(10) Patent No.: US 12,492,576 B2
(45) Date of Patent: Dec. 9, 2025

(54) LOCKSET

(71) Applicant: TAIWAN FU HSING INDUSTRIAL CO., LTD., Kaohsiung (TW)

(72) Inventors: Chao-Ming Huang, Kaohsiung (TW); Chi-Ming Chen, Kaohsiung (TW)

(73) Assignee: TAIWAN FU HSING INDUSTRIAL CO., LTD., Kaohsiung (TW)

( * ) Notice: Subject to any disclaimer, the term of this patent is extended or adjusted under 35 U.S.C. 154(b) by 69 days.

(21) Appl. No.: 18/411,003

(22) Filed: Jan. 11, 2024

(65) Prior Publication Data

US 2024/0271463 A1 Aug. 15, 2024

(30) Foreign Application Priority Data

Feb. 10, 2023 (TW) ................................ 112104768
Nov. 22, 2023 (TW) ................................ 112145183

(51) Int. Cl.
*E05B 35/08* (2006.01)
*E05B 27/00* (2006.01)
*E05B 27/02* (2006.01)

(52) U.S. Cl.
CPC ............ *E05B 35/08* (2013.01); *E05B 27/005* (2013.01); *E05B 27/0053* (2013.01); *E05B 27/02* (2013.01)

(58) Field of Classification Search
CPC ............... E05B 27/005; E05B 27/0053; E05B 27/0057; E05B 27/02; E05B 35/08; E05B 35/10
See application file for complete search history.

(56) References Cited

U.S. PATENT DOCUMENTS 2,266,163 A 12/1941 Ching
2,422,600 A 6/1947 Swanson
2,807,158 A * 9/1957 Ellison ................ E05B 27/0053 70/369
3,099,151 A * 7/1963 Schlage ................ E05B 27/005 70/383
3,175,379 A 3/1965 Russell
3,206,958 A * 9/1965 Ellison .................... E05B 9/086 70/369

(Continued)

FOREIGN PATENT DOCUMENTS

AU 2024200518 8/2024
CA 1146375 5/1983

(Continued)

*Primary Examiner* — Christopher J Boswell
(74) *Attorney, Agent, or Firm* — Winston Hsu

(57) ABSTRACT

A lockset includes a lock cylinder, a lock casing, a first lock member, a second lock member and an anti-theft member. The lock cylinder includes a key hole and a first lock slot. The lock casing includes a second lock slot. The first lock member is accommodated in the first lock slot. The second lock member is accommodated in the second lock slot. The anti-theft member is sandwiched in between the first lock member and the second lock member. When two ends of the anti-theft member are respectively located in the first lock slot and the second lock slot, the lock cylinder and the lock casing are locked. When a contact surface between the anti-theft member and the first lock member or the second lock member is aligned with a rotation interface between the lock cylinder and the lock casing, the lock cylinder and the lock casing are unlocked.

8 Claims, 12 Drawing Sheets

(56) References Cited

U.S. PATENT DOCUMENTS

| | | | | |
|---|---|---|---|---|
| 3,338,078 | A | 8/1967 | Eberitch | |
| 3,431,757 | A | 3/1969 | Hori | |
| 4,168,617 | A | 9/1979 | Prunbauer | |
| 4,368,629 | A | 1/1983 | Prunbauer | |
| 4,472,953 | A | 9/1984 | Gater | |
| 4,672,827 | A | 6/1987 | Craig | |
| 4,836,002 | A * | 6/1989 | Monahan | E05B 27/005 70/385 |
| 4,912,953 | A | 4/1990 | Wobig | |
| 5,176,015 | A * | 1/1993 | Sussina | E05B 27/0053 70/369 |
| 5,682,779 | A * | 11/1997 | Dolev | E05B 27/0039 70/411 |
| 5,799,519 | A * | 9/1998 | Hsiao | E05B 27/005 70/358 |
| 6,314,774 | B1 * | 11/2001 | Andersson | E05B 27/0053 70/357 |
| 6,851,292 | B2 | 2/2005 | Krühn | |
| 6,951,123 | B2 * | 10/2005 | Chong | E05B 27/005 70/370 |
| 7,290,418 | B2 * | 11/2007 | Herdman | E05B 27/0053 70/343 |
| 7,533,550 | B2 * | 5/2009 | Herdman | E05B 27/005 70/386 |
| 7,802,455 | B2 * | 9/2010 | Herdman | E05B 27/005 70/385 |
| 8,117,876 | B2 | 2/2012 | Mathachan | |
| 8,347,675 | B2 | 1/2013 | Seliber | |
| 9,260,884 | B2 | 2/2016 | Li | |
| 9,506,272 | B2 | 11/2016 | Gerlings | |
| 10,273,716 | B2 | 4/2019 | Huang | |
| 10,808,421 | B2 | 10/2020 | Clifford | |
| 11,613,910 | B2 | 3/2023 | Clifford | |
| 2007/0017264 | A1 | 1/2007 | Seliber | |
| 2007/0193317 | A1 | 8/2007 | Herdman | |
| 2010/0018267 | A1 | 1/2010 | Huang | |
| 2010/0300161 | A1 | 12/2010 | Lin | |
| 2014/0290317 | A1 | 10/2014 | Li | |
| 2017/0152678 | A1 | 6/2017 | Clifford | |
| 2019/0024410 | A1 | 1/2019 | Huang | |
| 2020/0024865 | A1 | 1/2020 | Clifford | |
| 2024/0271463 | A1 | 8/2024 | Huang | |

FOREIGN PATENT DOCUMENTS

| | | | |
|---|---|---|---|
| CA | 2184655 | | 3/1997 |
| CN | 201401055 | | 2/2010 |
| CN | 103015805 | | 4/2013 |
| CN | 102124176 | | 9/2013 |
| CN | 203223073 | | 10/2013 |
| CN | 203531524 | | 4/2014 |
| EP | 0 611 862 | A2 | 8/1994 |
| TW | 444092 | | 7/2001 |
| TW | 200811350 | | 3/2008 |
| TW | I379935 | B1 | 12/2012 |
| TW | M581626 | U | 8/2019 |
| TW | M629828 | U | 7/2022 |
| TW | M643124 | | 6/2023 |
| WO | 01/34927 | | 5/2001 |
| WO | 2011/009281 | A1 | 1/2011 |
| WO | 2012/021384 | | 2/2012 |

* cited by examiner

LOCKSET

BACKGROUND OF THE INVENTION

1. Field of the Invention

The invention relates to a lockset and, more particularly, to a lockset with anti-theft function.

2. Description of the Prior Art

In general, a lockset achieves lock and unlock functions by cooperation between a key and lock balls of a lock cylinder. When the tooth heights of the key correspond to the length variations of the lock balls, the key is able to rotate the lock cylinder to unlock the lockset. On the other hand, when the tooth heights of the key do not correspond to the length variations of the lock balls, the key is unable to rotate the lock cylinder to unlock the lockset. However, if the corresponding relationship between the tooth heights of the key and the length variations of the lock balls is cracked, the lockset will be easily unlocked, thereby causing harm to personal safety and/or property.

SUMMARY OF THE INVENTION

The invention provides a lockset with anti-theft function, so as to solve the aforesaid problems.

According to an embodiment of the invention, a lockset comprises a lock cylinder, a lock casing, a first lock member, a second lock member and an anti-theft member. The lock cylinder comprises a key hole and a first lock slot. The key hole extends along an axial direction of the lock cylinder. The first slot extends along a radial direction of the lock cylinder and communicates with the key hole. The lock casing is sleeved on the lock cylinder. The lock casing comprises a second lock slot. The second lock slot extends along a radial direction of the lock casing and corresponds to the first lock slot. The first lock member is accommodated in the first lock slot. The second lock member is accommodated in the second lock slot. The anti-theft member is sandwiched in between the first lock member and the second lock member. The key hole is configured to receive a first key and a second key. A cross-sectional shape of the first key is different from a cross-sectional shape of the second key. When two ends of the anti-theft member are respectively located in the first lock slot and the second lock slot, the lock cylinder and the lock casing are locked. When the first key is inserted into the key hole, a first contact point is formed between the first key and the first lock member, and a contact surface between the anti-theft member and the first lock member is aligned with a rotation interface between the lock cylinder and the lock casing, such that the lock cylinder and the lock casing are unlocked. When the second key is inserted into the key hole, a second contact point is formed between the second key and the first lock member, and a contact surface between the anti-theft member and the second lock member is aligned with the rotation interface between the lock cylinder and the lock casing, such that the lock cylinder and the lock casing are unlocked. A distance between the first contact point and the second contact point is equal to a thickness of the anti-theft member.

According to another embodiment of the invention, a lockset comprises a lock cylinder, a lock casing, a first lock member, a second lock member, an anti-theft member, a plurality of third lock members and a plurality of fourth lock members. The lock cylinder comprises a key hole, a first lock slot and a plurality of third lock slots. The key hole extends along an axial direction of the lock cylinder. The first slot extends along a radial direction of the lock cylinder and communicates with the key hole. The plurality of third lock slots extend along the radial direction of the lock cylinder and communicate with the key hole. The lock casing is sleeved on the lock cylinder. The lock casing comprises a second lock slot, a plurality of fourth lock slots, a through hole and a cover. The second lock slot extends along a radial direction of the lock casing and corresponds to the first lock slot. The plurality of fourth lock slots extend along the radial direction of the lock casing and correspond to the plurality of third lock slots. The through hole extends along an axial direction of the lock casing. The through hole corresponds to the plurality of third lock slots and does not correspond to the first slot. The cover covers the through hole. The first lock member is accommodated in the first lock slot. The second lock member is accommodated in the second lock slot. The anti-theft member is sandwiched in between the first lock member and the second lock member. The plurality of third lock members are accommodated in the plurality of third lock slots. The plurality of fourth lock members are accommodated in the plurality of fourth lock slots and abut against the plurality of third lock members. When two ends of the anti-theft member are respectively located in the first lock slot and the second lock slot, the lock cylinder and the lock casing are locked. When a contact surface between the anti-theft member and the first lock member or the second lock member is aligned with a rotation interface between the lock cylinder and the lock casing, the lock cylinder and the lock casing are unlocked.

As mentioned in the above, the invention adds the anti-theft member between the first lock member and the second lock member. When the contact surface between the anti-theft member and the first lock member or the second lock member is aligned with the rotation interface between the lock cylinder and the lock casing, the lock cylinder and the lock casing are unlocked. The invention may dispose the first lock member, the second lock member and the anti-theft member at the tail ends of the lock cylinder and the lock casing, so as to improve the difficulty of cracking the corresponding relationship between the anti-theft member and the rotating interface. Thus, even if the corresponding relationship between the tooth heights of a key and the length variations of other lock members is cracked, the lock cylinder and the lock casing are still locked as long as two ends of the anti-theft member are respectively located in the first lock slot and the second lock slot. Accordingly, the security of the lockset can be effectively improved. Furthermore, in an embodiment, the key hole is configured to receive the first key and the second key with different cross-sectional shapes. A user may replace the third lock members corresponding to the first key or the second key through the through hole of the lock casing, such that the first key and the second key both can be used to unlock or lock the lockset. Since the first lock member and the anti-theft member do not need to be replaced, the through hole of the lock casing does not need to correspond to the first lock slot.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
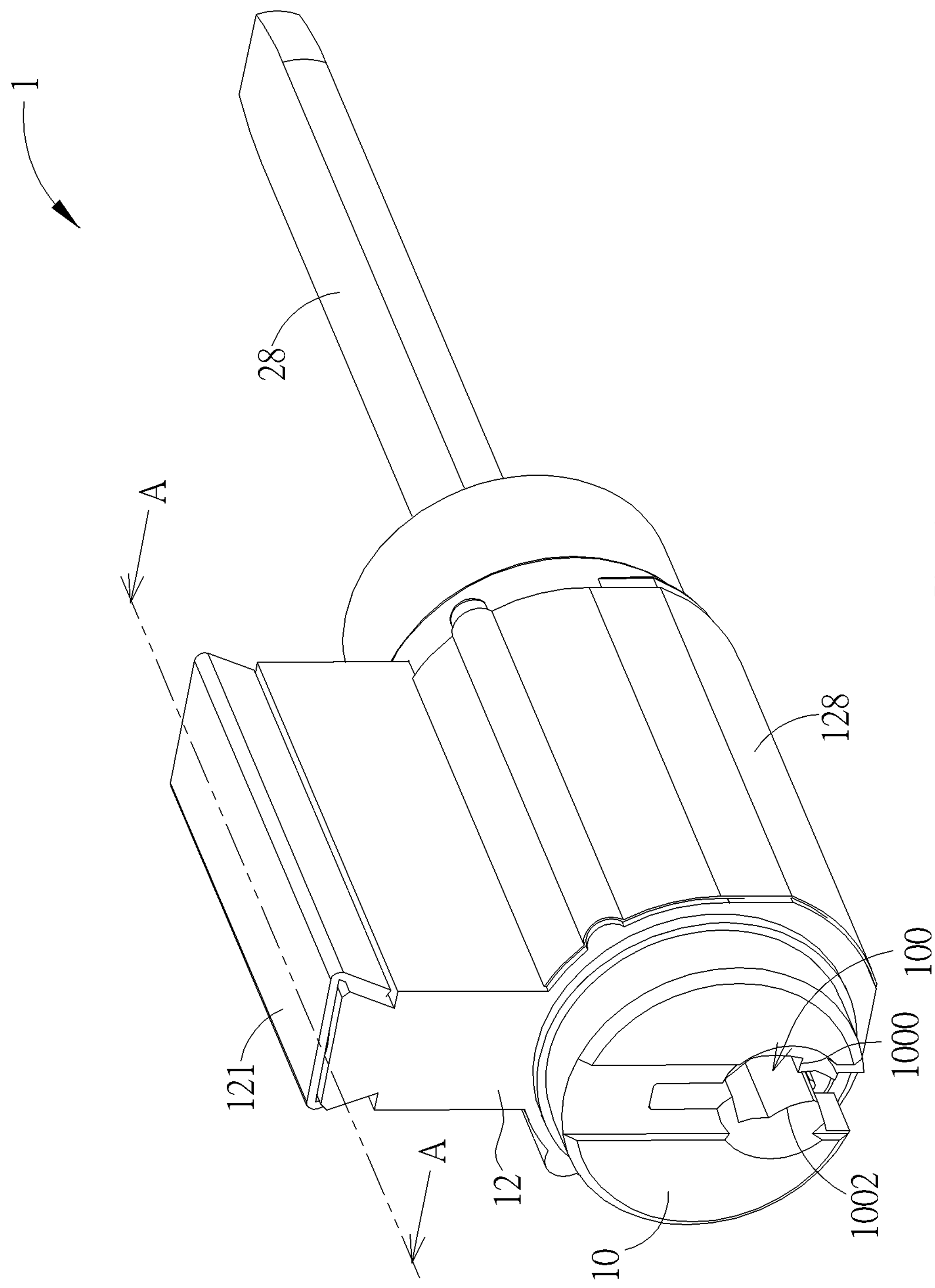
FIG. 1 is a perspective view illustrating a lockset according to an embodiment of the invention.
Figure 2:
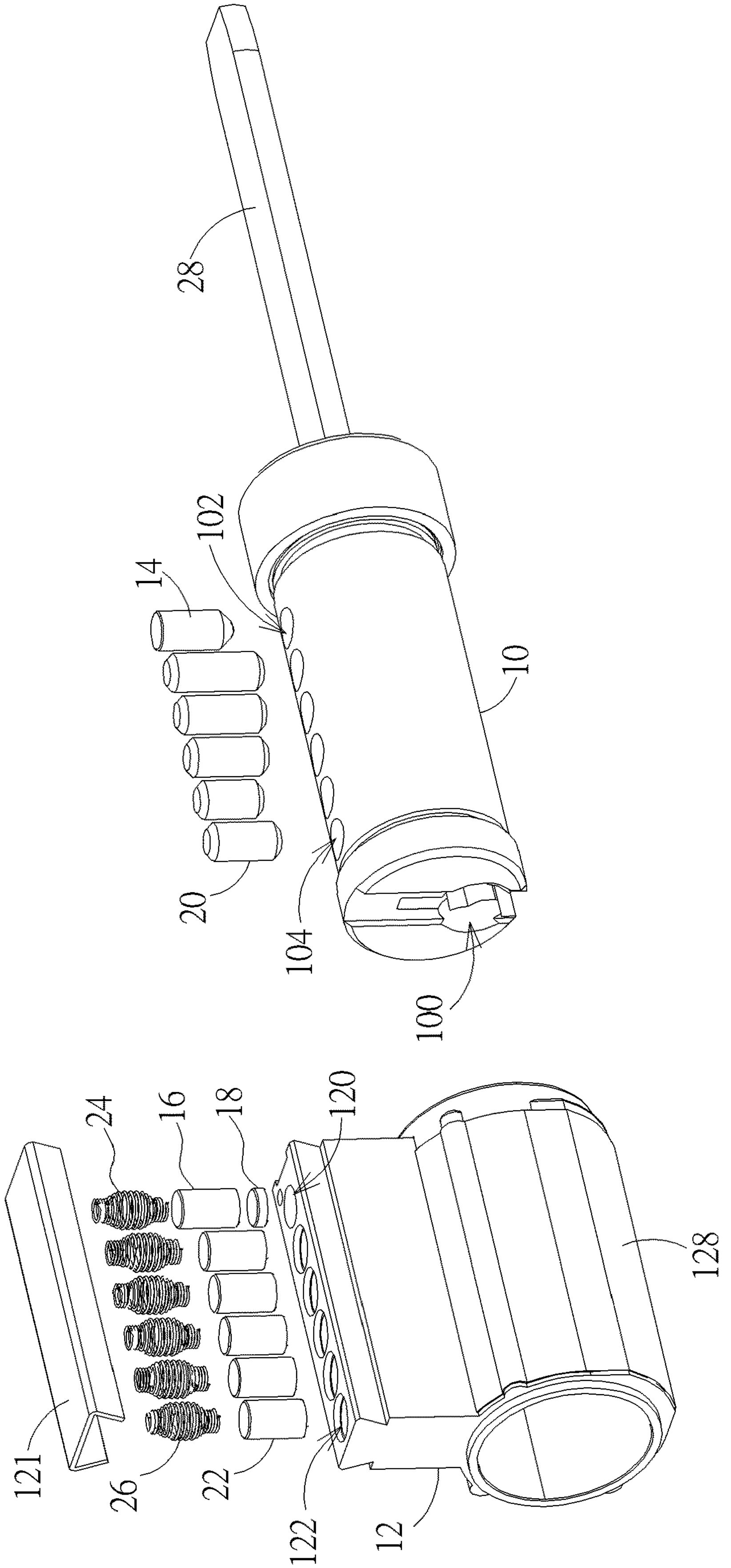
FIG. 2 is an exploded view illustrating the lockset shown in FIG. 1.
Figure 3:
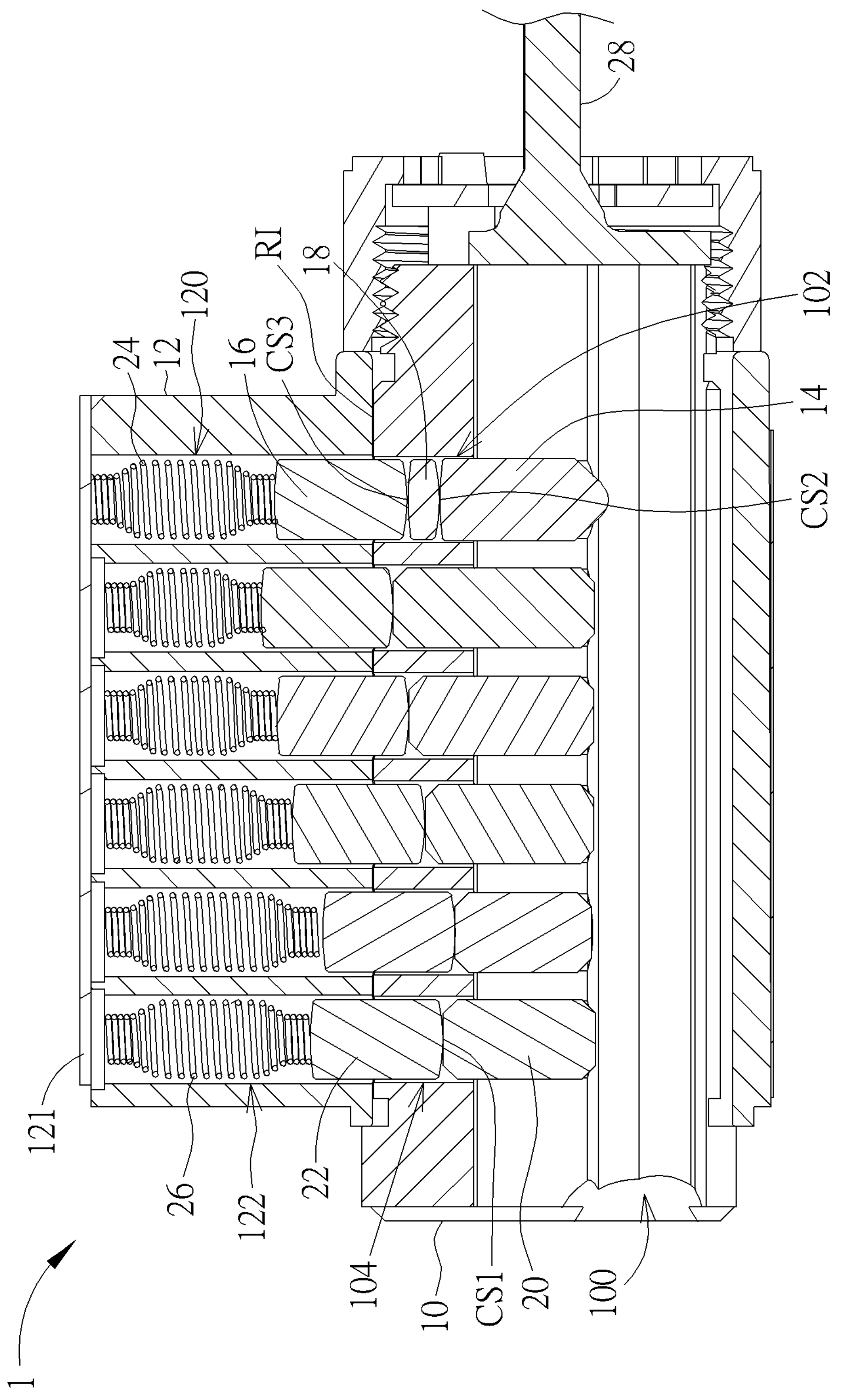
FIG. 3 is a sectional view illustrating the lockset shown in FIG. 1 along line A-A.
Figure 4:
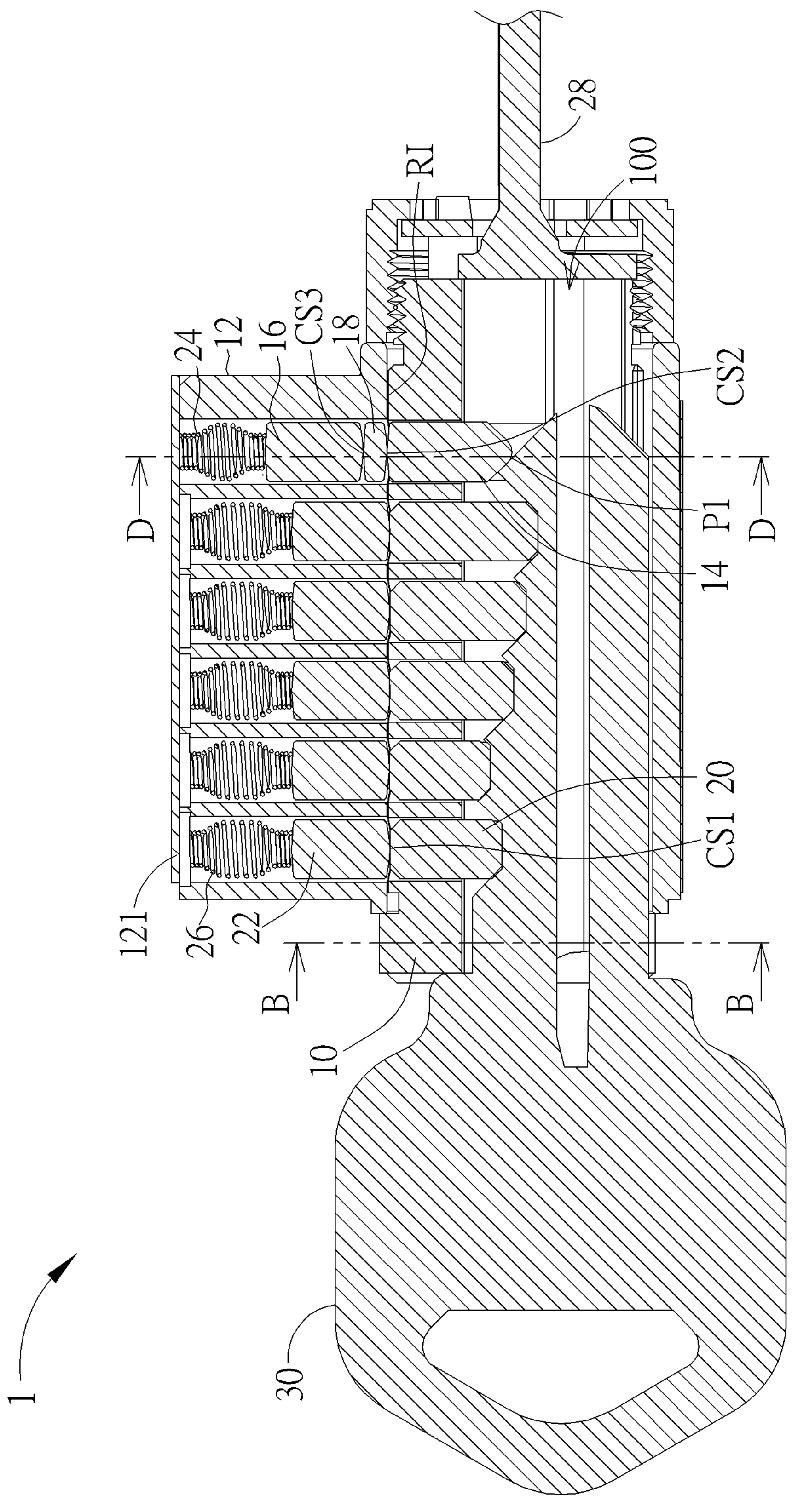
FIG. 4 is a sectional view illustrating a first key inserted into a key hole shown in FIG. 3.
Figure 5:
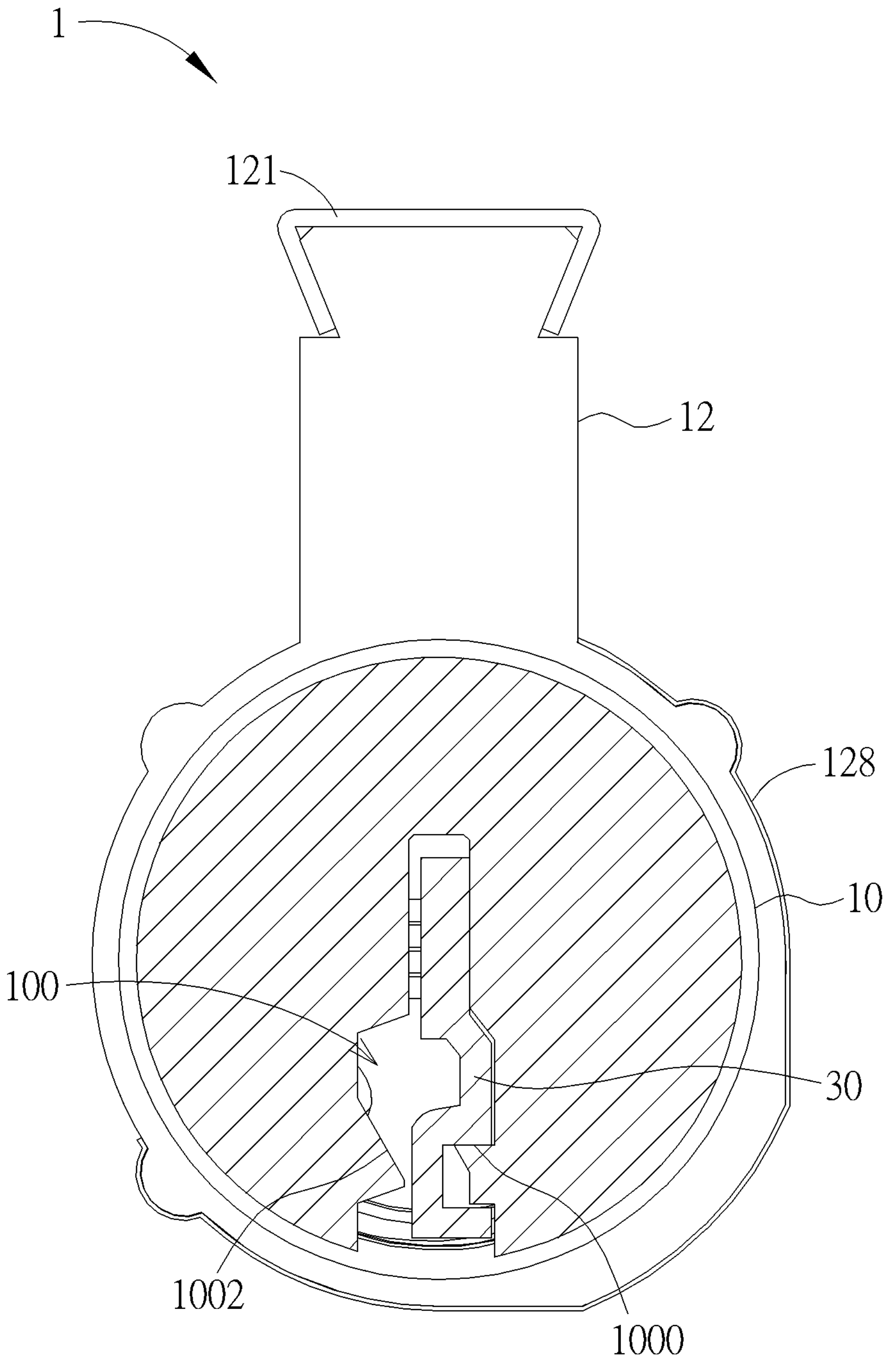
FIG. 5 is a sectional view illustrating the lockset shown in FIG. 4 along line B-B.
Figure 6:
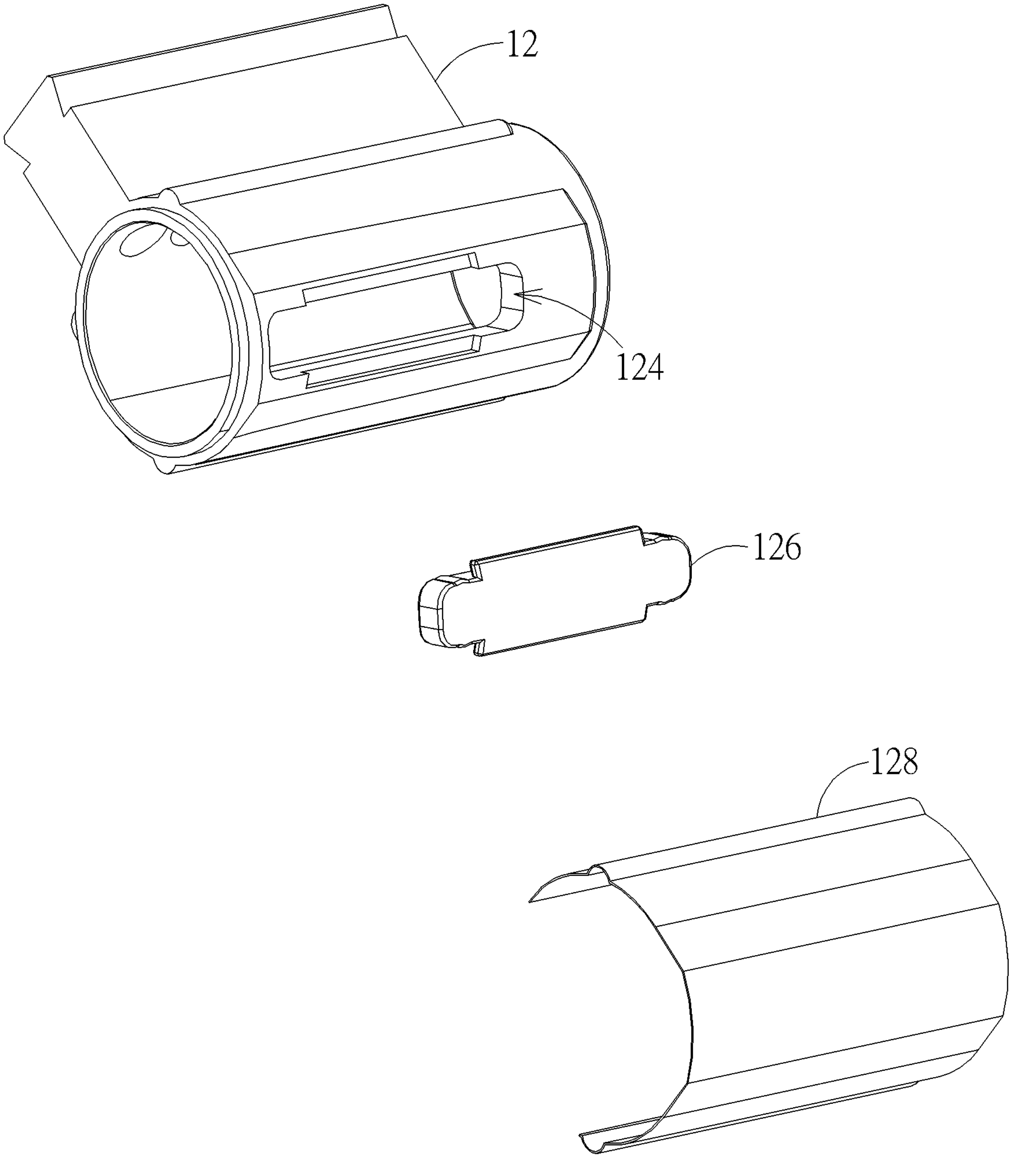
FIG. 6 is an exploded view illustrating a lock casing shown in FIG. 2.
Figure 7:
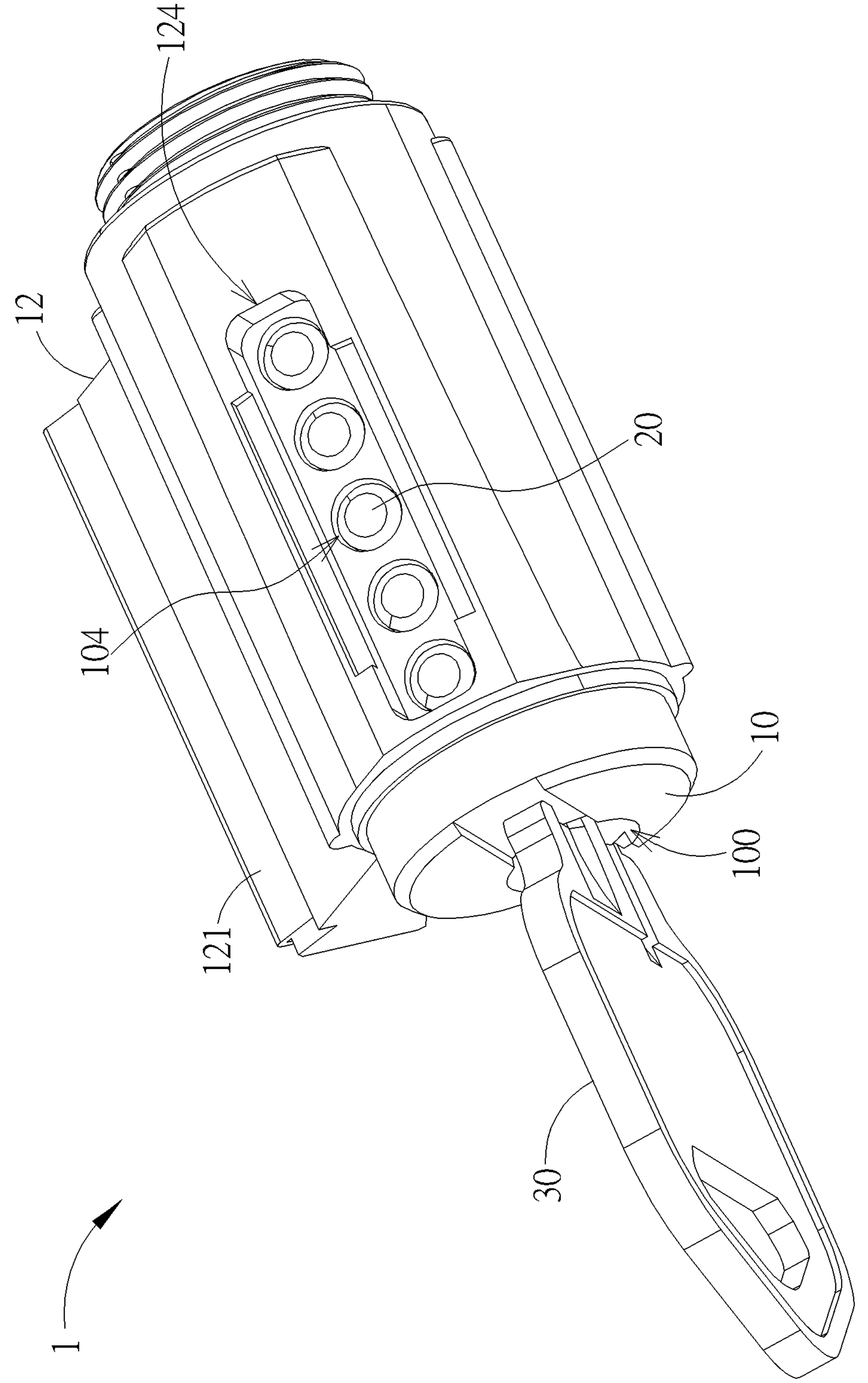
FIG. 7 is a perspective view illustrating third slots aligned with a through hole of a lock casing.
Figure 8:
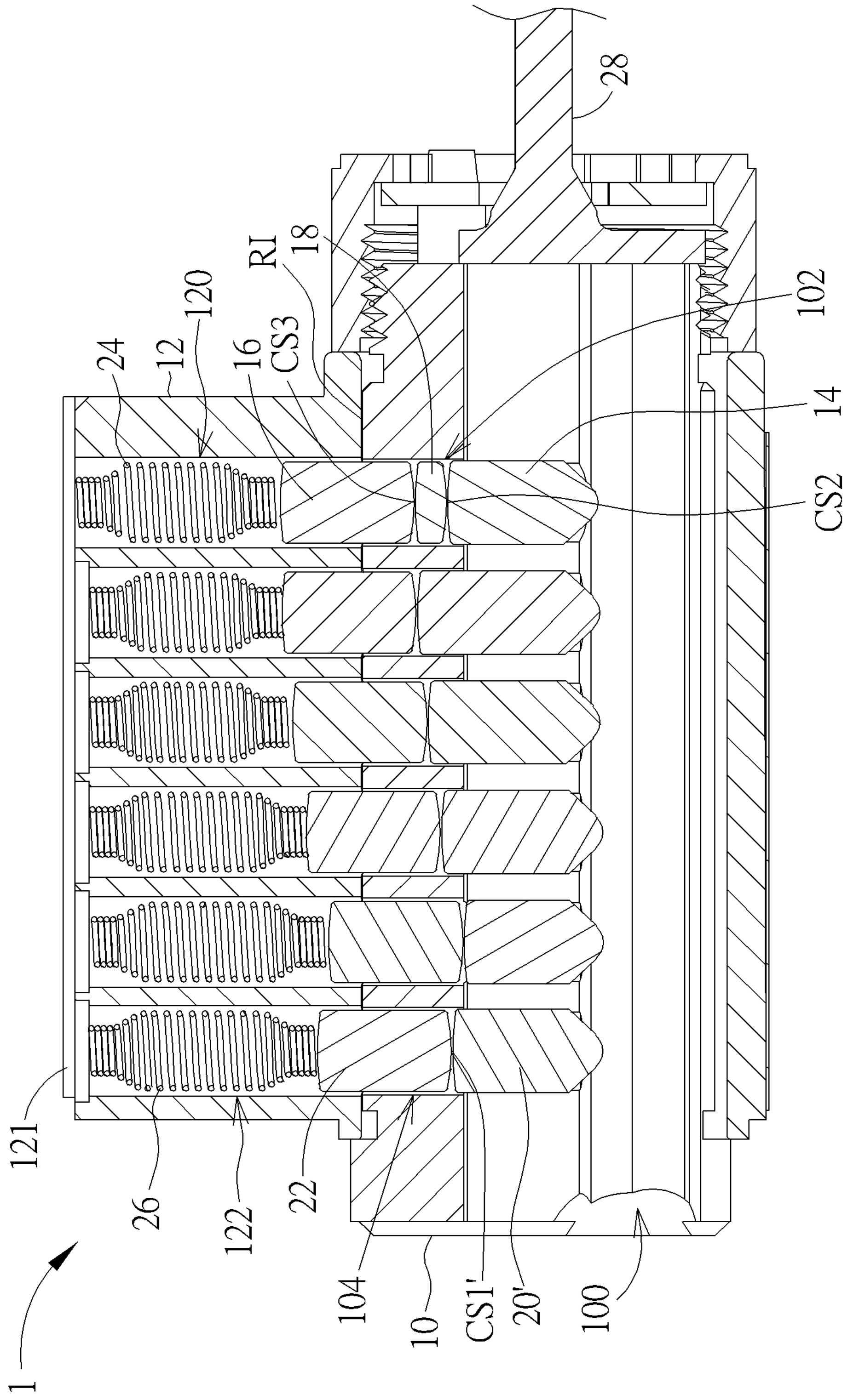
FIG. 8 is another sectional view illustrating the lockset.
Figure 9:
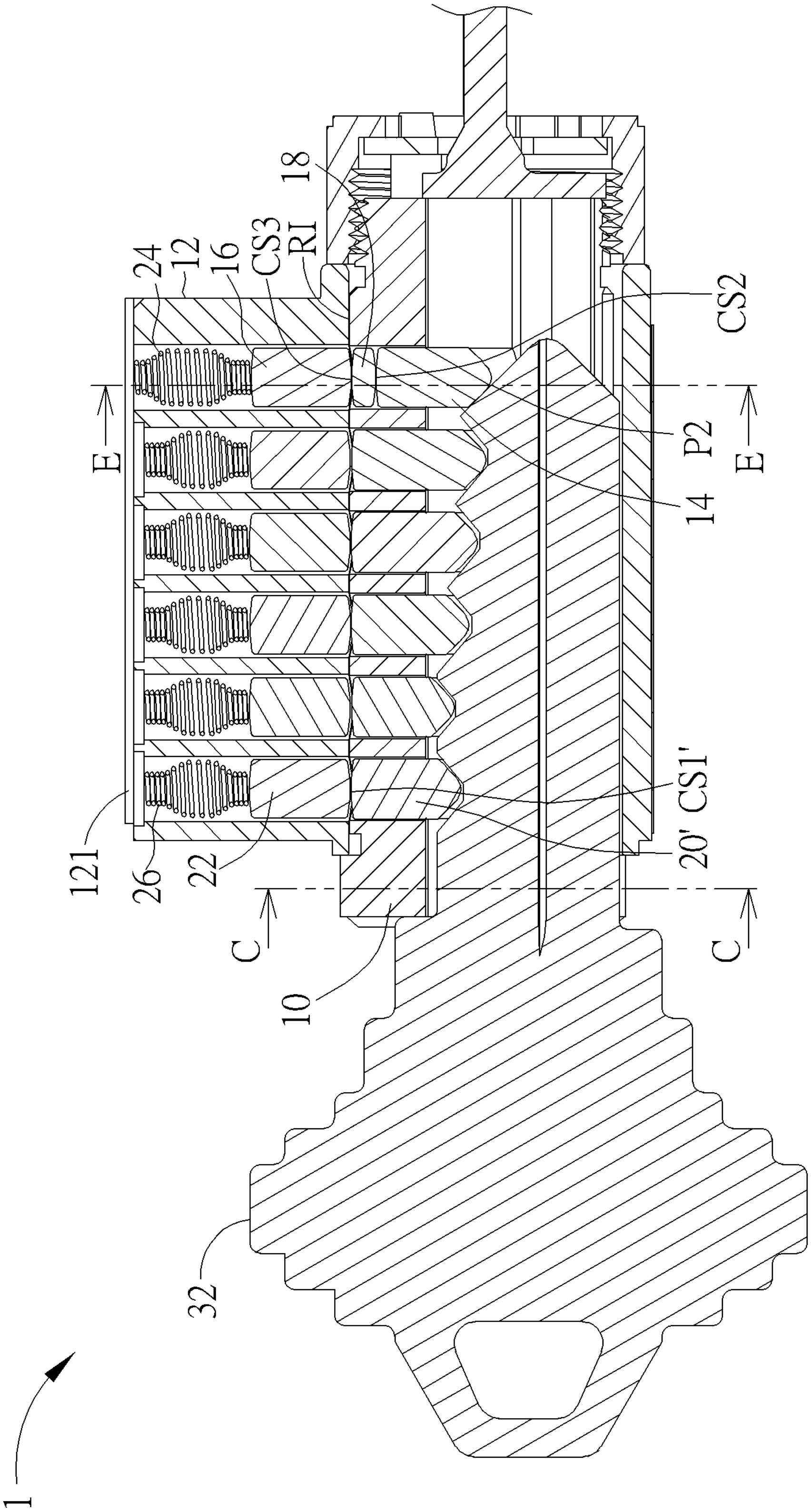
FIG. 9 is a sectional view illustrating a second key inserted into the key hole shown in FIG. 8.
Figure 10:
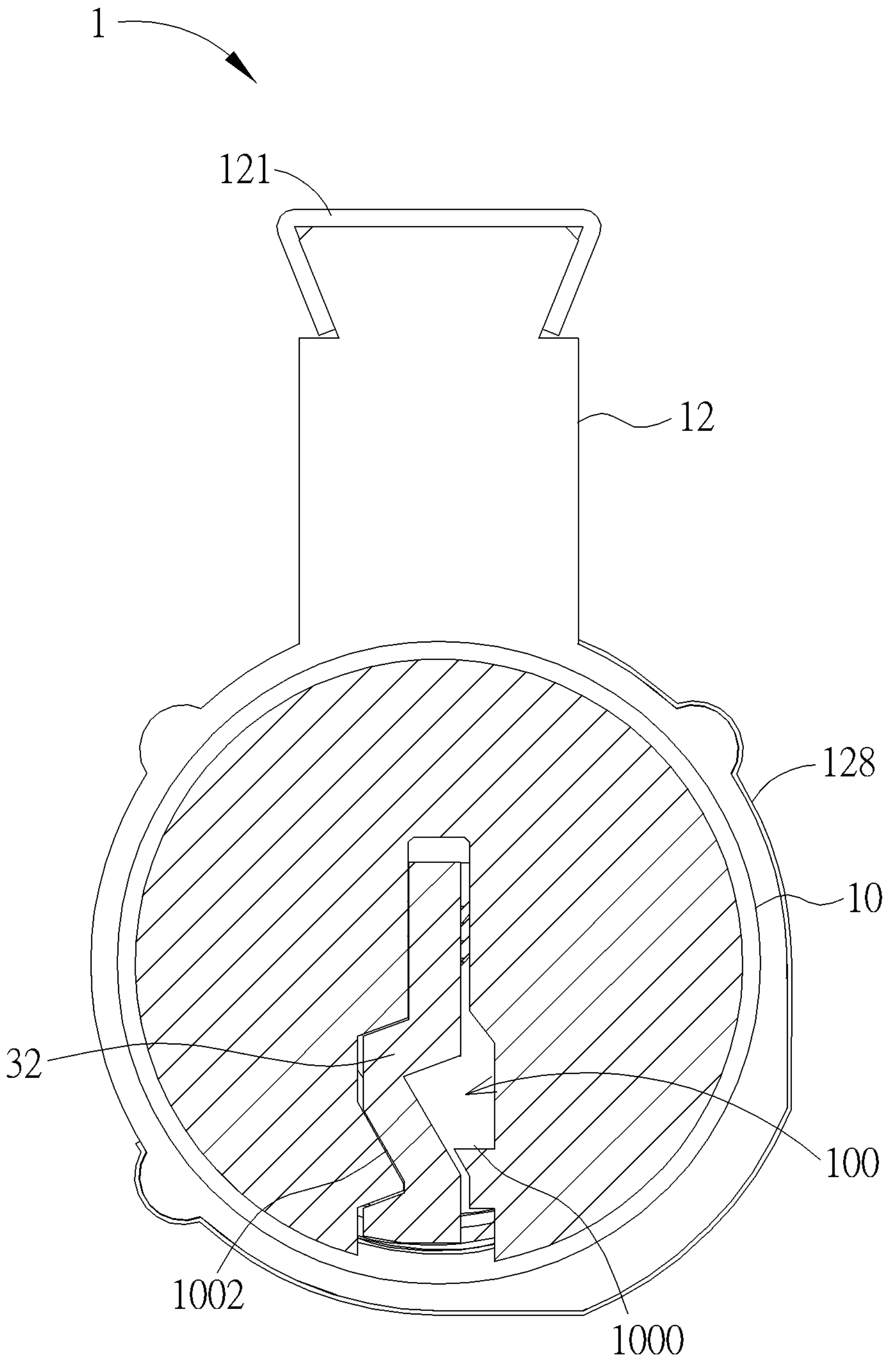
FIG. 10 is a sectional view illustrating the lockset shown in FIG. 9 along line C-C.
Figure 11:
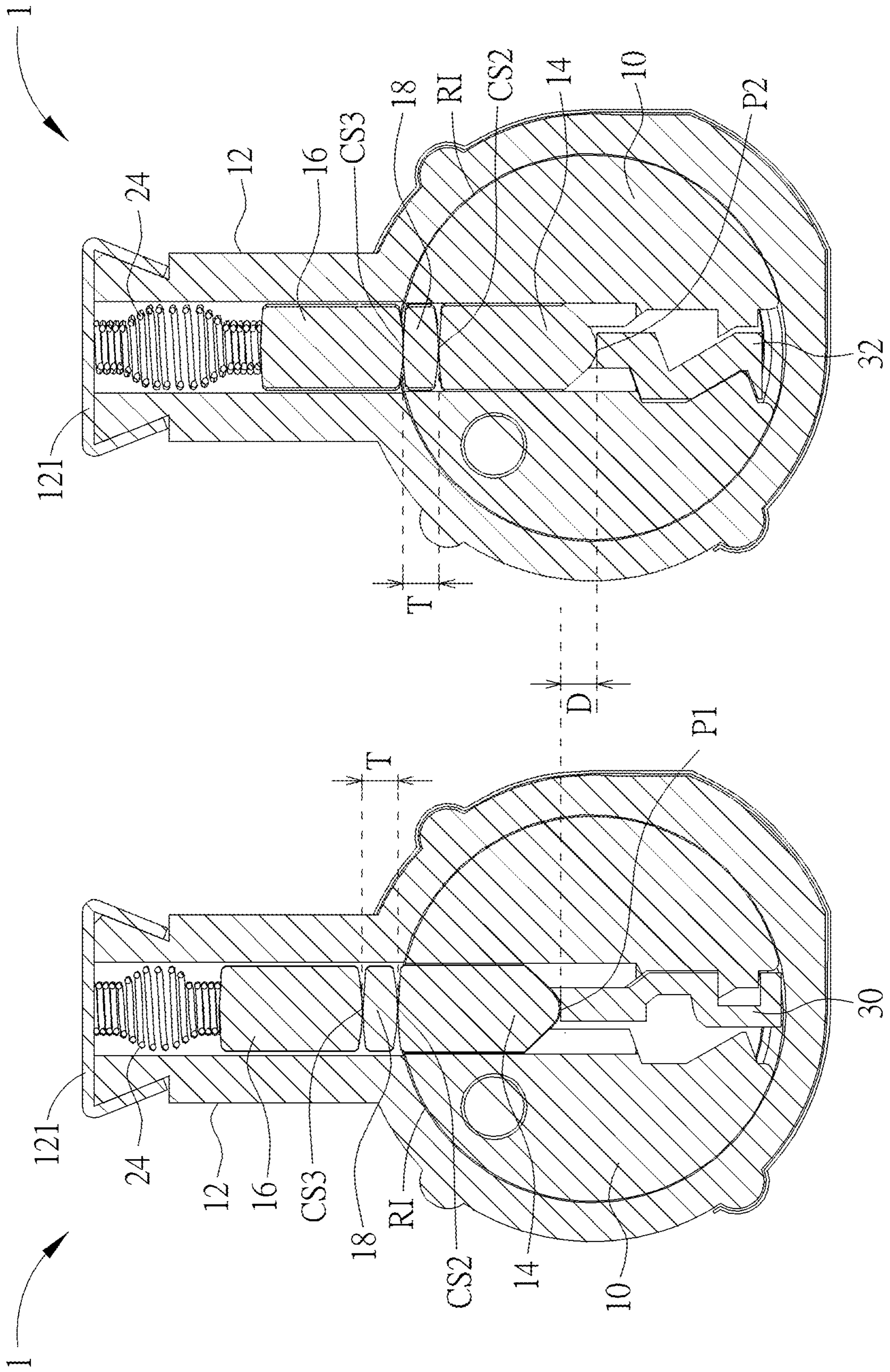
FIG. 11 is a sectional view illustrating the locksets shown in FIGS. 4 and 9 along lines D-D and E-E.
Figure 12:
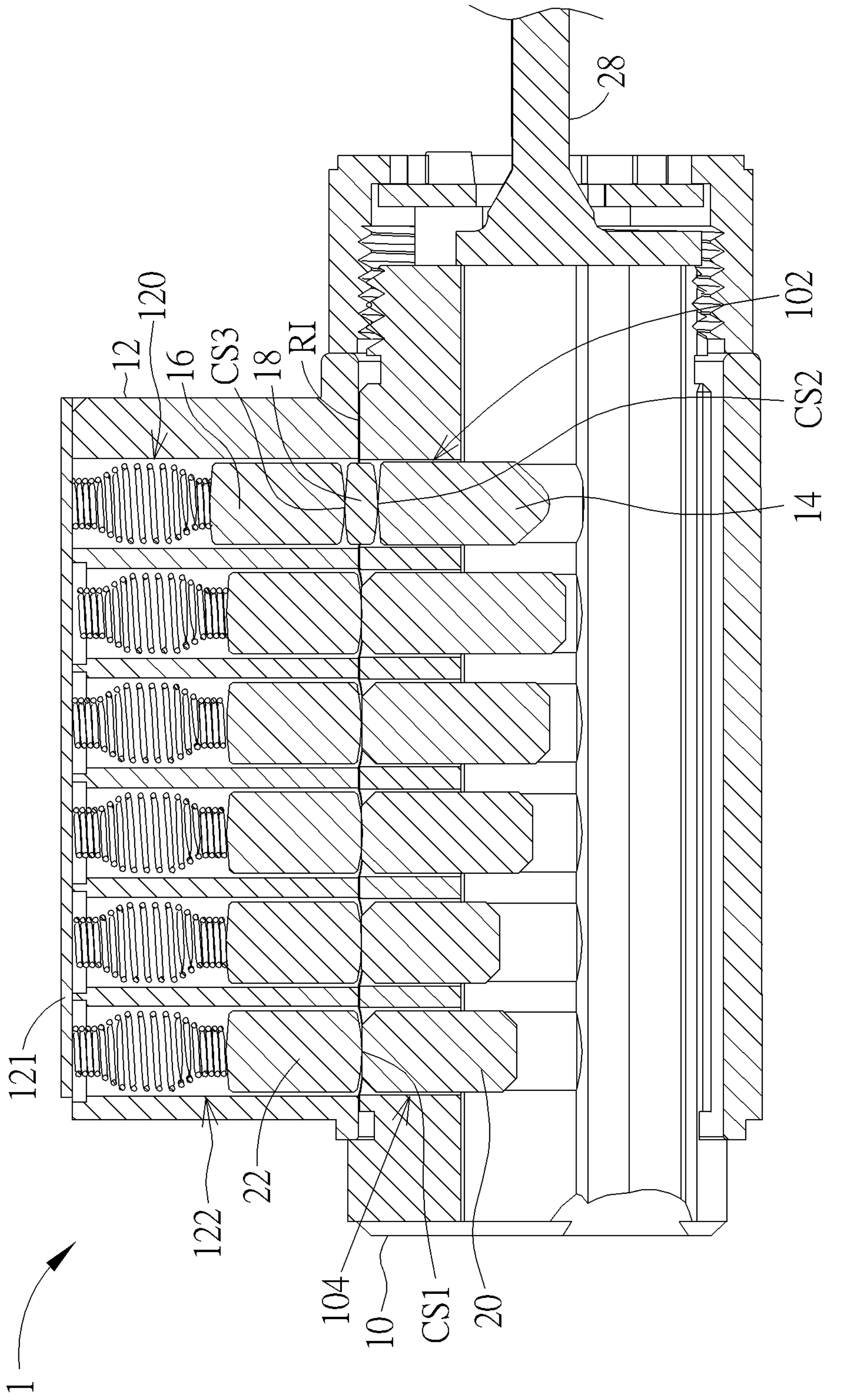
FIG. 12 is a sectional view illustrating two ends of an anti-theft member respectively located in a first lock slot and a second lock slot.

Referring to FIGS. 1 to 12, FIG. 1 is a perspective view illustrating a lockset 1 according to an embodiment of the invention, FIG. 2 is an exploded view illustrating the lockset 1 shown in FIG. 1, FIG. 3 is a sectional view illustrating the lockset 1 shown in FIG. 1 along line A-A, FIG. 4 is a sectional view illustrating a first key 30 inserted into a key hole 100 shown in FIG. 3, FIG. 5 is a sectional view illustrating the lockset 1 shown in FIG. 4 along line B-B, FIG. 6 is an exploded view illustrating a lock casing 12 shown in FIG. 2, FIG. 7 is a perspective view illustrating third slots 104 aligned with a through hole 124 of a lock casing 12, FIG. 8 is another sectional view illustrating the lockset 1, FIG. 9 is a sectional view illustrating a second key 32 inserted into the key hole 100 shown in FIG. 8, FIG. 10 is a sectional view illustrating the lockset 1 shown in FIG. 9 along line C-C, FIG. 11 is a sectional view illustrating the locksets 1 shown in FIGS. 4 and 9 along lines D-D and E-E, and FIG. 12 is a sectional view illustrating two ends of an anti-theft member 18 respectively located in a first lock slot 102 and a second lock slot 120.

As shown in FIGS. 1 to 3, the lockset 1 comprises a lock cylinder 10, a lock casing 12, a first lock member 14, a second lock member 16, an anti-theft member 18, a plurality of third lock members 20, a plurality of fourth lock members 22, a first elastic member 24 and a plurality of second elastic members 26.

The lock cylinder 10 comprises a key hole 100, a first lock slot 102 and a plurality of third lock slots 104, wherein the key hole 100 extends along an axial direction of the lock cylinder 10, and the first slot 102 and the third lock slots 104 extend along a radial direction of the lock cylinder 10. Furthermore, the first slot 102 and the third lock slots 104 communicate with the key hole 100. In this embodiment, the first lock slot 102 may be arranged side by side with the third lock slots 104 at equal intervals, but the invention is not so limited.

The lock casing 12 is sleeved on the lock cylinder 10. The lock casing 12 comprises a second lock slot 120 and a plurality of fourth lock slots 122, wherein the second lock slot 120 and the fourth lock slots 122 extend along a radial direction of the lock casing 12. In this embodiment, the second lock slot 120 may be arranged side by side with the fourth lock slots 122 at equal intervals, but the invention is not so limited.

When the lock casing 12 is sleeved on the lock cylinder 10, the second lock slot 120 of the lock casing 12 corresponds to the first lock slot 102 of the lock cylinder 10, and the fourth lock slots 122 of the lock casing 12 correspond to the third lock slots 104 of the lock cylinder 10. In other words, when the lock casing 12 is sleeved on the lock cylinder 10, the second lock slot 120 of the lock casing 12 may communicate with the first lock slot 102 of the lock cylinder 10, and the fourth lock slots 122 of the lock casing 12 may communicate with the third lock slots 104 of the lock cylinder 10.

The first lock member 14 is accommodated in the first lock slot 102 of the lock cylinder 10, the second lock member 16 is accommodated in the second lock slot 120 of the lock casing 12, and the anti-theft member 18 is sandwiched in between the first lock member 14 and the second lock member 16. Furthermore, the third lock members 20 are accommodated in the third lock slots 104 of the lock cylinder 10, and the fourth lock members 22 are accommodated in the fourth lock slots 122 of the lock casing 12, wherein the fourth lock members 22 abut against the third lock members 20.

The first elastic member 24 is disposed in the second lock slot 120 of the lock casing 12 and abuts against the second lock member 16 and a main cover 121 of the lock casing 12. The first elastic member 24 is configured to push the second lock member 16, the anti-theft member 18 and the first lock member 14 toward the key hole 100. The second elastic members 26 are disposed in the fourth lock slots 122 of the lock casing 12 and abut against the fourth lock members 22 and the main cover 121 of the lock casing 12. The second elastic members 26 are configured to push the fourth lock members 22 and the third lock members 20 toward the key hole 100. In this embodiment, the first elastic member 24 and the second elastic members 26 may be, but are not limited to, springs.

It should be noted that the number of third lock members 20, fourth lock members 22 and second elastic members 26 may be determined according to the number of third lock slots 104 and fourth lock slots 122, so the invention is not limited to the embodiment shown in the figure.

As shown in FIG. 3, when there is no key inserted into the key hole 100 of the lock cylinder 10, two ends of the second lock member 16 are respectively located in the first lock slot 102 and the second lock slot 120, and two ends of each fourth lock member 22 are respectively located in the third lock slot 104 and the fourth lock slot 122. At this time, the lock cylinder 10 and the lock casing 12 are locked, such that the lock cylinder 10 cannot rotate with respect to the lock casing 12. It should be noted that a rotation interface RI between the lock cylinder 10 and the lock casing 12 refers to a junction between an outer ring surface of the lock cylinder 10 and an inner ring surface of the lock casing 12.

As shown in FIG. 4, a user may insert a first key 30 into the key hole 100 of the lock cylinder 10 to unlock the lock cylinder 10 and the lock casing 12. When the first key 30 is inserted into the key hole 100, the first key 30 pushes the third lock members 20 to drive the fourth lock members 22 to move, such that contact surfaces CS1 between the third lock members 20 and the fourth lock members 22 are aligned with the rotation interface RI between the lock cylinder 10 and the lock casing 12. Then, the first key 30 pushes the first lock member 14 to drive the anti-theft member 18 and the second lock member 16 to move, such that a contact surface CS2 between the anti-theft member 18 and the first lock member 14 is aligned with the rotation interface RI between the lock cylinder 10 and the lock casing 12. When the contact surfaces CS1, CS2 are aligned with the rotation interface RI, the lock cylinder 10 and the lock casing 12 are unlocked. At this time, the user may rotate the first key 30 to drive the lock cylinder 10 to rotate with respect to the lock casing 12. In this embodiment, the lockset 1 may further comprise a transmission rod 28 connected to the lock cylinder 19. When the lock cylinder 10 rotates with respect to the lock casing 12, the lock cylinder 10 drives the transmission rod 28 to rotate to drive a latch (not shown) to move.

As shown in FIGS. 4, 5, 9 and 10, the key hole 100 of the lock cylinder 10 is configured to receive a first key 30 and a second key 32, wherein a cross-sectional shape of the first key 30 is different from a cross-sectional shape of the second key 32. Thus, as long as the third lock members 20 shown in FIG. 4 are replaced by the third lock members 20' shown in FIG. 9, the second key 32 may be used to unlock or lock the lockset 1.

As shown in FIG. 6, the lock casing 12 may further comprise a through hole 124, a cover 126 and a restraining member 128. The through hole 124 extends along an axial direction of the lock casing 12. Furthermore, the through hole 124 corresponds to the third lock slots 104 (as shown in FIG. 7) of the lock cylinder 10 and does not correspond to the first lock slot 102 (as shown in FIG. 3). The cover 126 is disposed in the through hole 124 to cover the through hole 124. The restraining member 128 is configured to restrain the cover 126 on the lock casing 12. In this embodiment, the restraining member 128 may be, but is not limited to, a sticker. When a user wants to replace the third lock members 20, the user may use the first key 30 to rotate the lock cylinder 10 to the position shown in FIG. 7, such that the third lock slots 104 of the lock cylinder 10 are aligned with the through hole 124 of the lock casing 12. Since the through hole 124 does not correspond to the first lock slot 102, the first lock slot 102 is not exposed from the through hole 124. Then, the user may detach the restraining member 128 and the cover 126, take out the third lock members 20 from the through hole 124, and pull the first key 30 out of the key hole 100 of the lock cylinder 10. Then, the user may insert the second key 32 into the key hole 100 and put the third lock members 20' (as shown in FIG. 9) corresponding to the second key 32 into the third lock slots 104 through the through hole 124. Accordingly, the third lock members 20 are replaced by the third lock members 20' shown in FIG. 9. Then, the user may assemble the cover 126 and the restraining member 128 to the lock casing 12 and then use the second key 32 to rotate the lock cylinder 10 to the position shown in FIG. 9, such that the third lock slots 104 of the lock cylinder 10 are aligned with the fourth lock slots 122 of the lock casing 12.

As shown in FIG. 8, when there is no key inserted into the key hole 100 of the lock cylinder 10, two ends of the second lock member 16 are respectively located in the first lock slot 102 and the second lock slot 120, and two ends of each fourth lock member 22 are respectively located in the third lock slot 104 and the fourth lock slot 122. At this time, the lock cylinder 10 and the lock casing 12 are locked, such that the lock cylinder 10 cannot rotate with respect to the lock casing 12.

As shown in FIG. 9, a user may insert a second key 32 into the key hole 100 of the lock cylinder 10 to unlock the lock cylinder 10 and the lock casing 12. When the second key 32 is inserted into the key hole 100, the second key 32 pushes the third lock members 20' to drive the fourth lock members 22 to move, such that contact surfaces CS1' between the third lock members 20' and the fourth lock members 22 are aligned with the rotation interface RI between the lock cylinder 10 and the lock casing 12. Then, the second key 32 pushes the first lock member 14 to drive the anti-theft member 18 and the second lock member 16 to move, such that a contact surface CS3 between the anti-theft member 18 and the second lock member 16 is aligned with the rotation interface RI between the lock cylinder 10 and the lock casing 12. When the contact surfaces CS1', CS3 are aligned with the rotation interface RI, the lock cylinder 10 and the lock casing 12 are unlocked. At this time, the user may rotate the second key 32 to drive the lock cylinder 10 to rotate with respect to the lock casing 12. When the lock cylinder 10 rotates with respect to the lock casing 12, the lock cylinder 10 drives the transmission rod 28 to rotate to drive a latch (not shown) to move.

As shown in FIG. 4, when the first key 30 is inserted into the key hole 100, a first contact point P1 is formed between the first key 30 and the first lock member 14. As shown in FIG. 9, when the second key 32 is inserted into the key hole 100, a second contact point P2 is formed between the second key 32 and the first lock member 14. As shown in FIG. 11, a distance D between the first contact point P1 and the second contact point P2 along the radial direction of the lock cylinder 10 is equal to a thickness T of the anti-theft member 18 along the radial direction of the lock cylinder 10. Thus, when the first key 30 is inserted into the key hole 100, the contact surface CS2 between the anti-theft member 18 and the first lock member 14 is aligned with the rotation interface RI between the lock cylinder 10 and the lock casing 12; and when the second key 32 is inserted into the key hole 100, the contact surface CS3 between the anti-theft member 18 and the second lock member 16 is aligned with the rotation interface RI between the lock cylinder 10 and the lock casing 12. Accordingly, as long as the third lock members 20 shown in FIG. 4 are replaced with the third lock members 20' shown in FIG. 9, the second key 32 may be used to unlock or lock the lockset 1 without replacing the first lock member 14 and the anti-theft member 18. Therefore, the through hole 124 of the lock casing 12 does not need to correspond to the first lock slot 102.

As shown in FIG. 12, when two ends of the anti-theft member 18 are respectively located in the first lock slot 102 and the second lock slot 120, the lock cylinder 10 and the lock casing 12 are locked. Since the thickness T of the anti-theft member 18 is small, it is difficult for an interested person to use a lock opening tool to move the contact surface CS2, CS3 between the anti-theft member 18 and the first lock member 14 or the second lock member 16 to align with the rotation interface RI between the lock cylinder 10 and the lock casing 12. Even if the anti-theft member 18 is pushed by the lock opening tool, it is easy to push the anti-theft member 18 excessively due to the small thickness T of the anti-theft member 18, such that a part of the first lock member 14 enters the second lock slot 120 to keep the lock cylinder 10 and the lock casing 12 in a locked state in which they cannot rotate with respect to each other. Thus, even if the interested person uses the lock opening tool to move the contact surfaces CS1 between the third lock members 20 and the fourth lock members 22 to align with the rotation interface RI between the lock cylinder 10 and the lock casing 12, as long as two ends of the anti-theft member 18, the first lock member 14 or the second lock member 16 are still respectively located in the first lock slot 102 and the second lock slot 120, the lockset 1 still cannot be unlocked.

In this embodiment, the first lock slot 102 may be located at a tail end of the lock cylinder 10 and the second lock slot 120 may be located at a tail end of the lock casing 12. The tail end of the lock cylinder 10 refers to an end of the lock cylinder 10 far away from an opening of the key hole 100, and the tail end of the lock casing 12 corresponds to the tail end of the lock cylinder 10. Accordingly, the difficulty of cracking the corresponding relationship between the anti-theft member 18 and the rotation interface RI can be improved. Furthermore, the diameters of the first lock member 14, the first lock slot 102, the second lock member 16, the second lock slot 120 and the anti-theft member 18 may be reduced, such that the position of the first lock member 14 is difficult to reach, thereby improving the anti-theft effect.

As shown in FIG. 1, the key hole 100 of the lock cylinder 10 may comprise a first abutting portion 1000 and a second abutting portion 1002, wherein the first abutting portion 1000 is opposite to the second abutting portion 1002. As shown in FIG. 5, when the first key 30 is inserted into the key hole 100, the first key 30 may abut against the first abutting portion 1000. As shown in FIG. 10, when the second key 32 is inserted into the key hole 100, the second key 32 may abut against the second abutting portion 1002. In this embodiment, the cross-section of the first key 30 may be K type and the cross-section of the second key may be S type, but the invention is not so limited. The shape of the key hole 100 may be designed according to multiple different types of keys, such that the key hole 100 may be configured to receive multiple different types of keys.

As mentioned in the above, the invention adds the anti-theft member between the first lock member and the second lock member. When the contact surface between the anti-theft member and the first lock member or the second lock member is aligned with the rotation interface between the lock cylinder and the lock casing, the lock cylinder and the lock casing are unlocked. The invention may dispose the first lock member, the second lock member and the anti-theft member at the tail ends of the lock cylinder and the lock casing, so as to improve the difficulty of cracking the corresponding relationship between the anti-theft member and the rotating interface. Thus, even if the corresponding relationship between the tooth heights of a key and the length variations of other lock members is cracked, the lock cylinder and the lock casing are still locked as long as two ends of the anti-theft member are respectively located in the first lock slot and the second lock slot. Accordingly, the security of the lockset can be effectively improved. Furthermore, in an embodiment, the key hole is configured to receive the first key and the second key with different cross-sectional shapes. A user may replace the third lock members corresponding to the first key or the second key through the through hole of the lock casing, such that the first key and the second key both can be used to unlock or lock the lockset. Since the first lock member and the anti-theft member do not need to be replaced, the through hole of the lock casing does not need to correspond to the first lock slot.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lockset comprising:

a lock cylinder comprising a key hole and a first lock slot, the key hole extending along an axial direction of the lock cylinder, the first slot extending along a radial direction of the lock cylinder and communicating with the key hole;

a lock casing sleeved on the lock cylinder, the lock casing comprising a second lock slot, the second lock slot extending along a radial direction of the lock casing and corresponding to the first lock slot;

a first lock member accommodated in the first lock slot;

a second lock member accommodated in the second lock slot; and an anti-theft member sandwiched in between the first lock member and the second lock member;

wherein the key hole is configured to receive a first key and a second key, a cross-sectional shape of the first key is different from a cross-sectional shape of the second key, the cross-sectional shapes of the first and second keys are obtained by cutting a non-bitted region of the first and second keys inside the cylinder; wherein, when two ends of the anti-theft member are respectively located in the first lock slot and the second lock slot, the lock cylinder and the lock casing are locked; wherein, when the first key is inserted into the key hole, a first contact point is formed between the first key and the first lock member, and a contact surface between the anti-theft member and the first lock member is aligned with a rotation interface between the lock cylinder and the lock casing, such that the lock cylinder and the lock casing are unlocked; wherein, when the second key is inserted into the key hole, a second contact point is formed between the second key and the first lock member, and a contact surface between the anti-theft member and the second lock member is aligned with the rotation interface between the lock cylinder and the lock casing, such that the lock cylinder and the lock casing are unlocked; wherein a distance between the first contact point and the second contact point is equal to a thickness of the anti-theft member.

2. The lockset of claim 1, wherein, when the first key is inserted into the key hole, the first key pushes the first lock member to drive the anti-theft member and the second lock member to move, such that the contact surface between the anti-theft member and the first lock member is aligned with the rotation interface between the lock cylinder and the lock casing; wherein, when the second key is inserted into the key hole, the second key pushes the first lock member to drive the anti-theft member and the second lock member to move, such that the contact surface between the anti-theft member and the second lock member is aligned with the rotation interface between the lock cylinder and the lock casing.

3. The lockset of claim 1, wherein the key hole comprises a first abutting portion and a second abutting portion, and the first abutting portion is opposite to the second abutting portion; wherein, when the first key is inserted into the key hole, the first key abuts against the first abutting portion; wherein, when the second key is inserted into the key hole, the second key abuts against the second abutting portion.

4. The lockset of claim 1, wherein the lock cylinder further comprises a plurality of third lock slots, the plurality of third lock slots extend along the radial direction of the lock cylinder and communicate with the key hole, the lock casing further comprises a plurality of fourth lock slots, the plurality of fourth lock slots extend along the radial direction of the lock casing and correspond to the plurality of third lock slots, and the lockset further comprises:

a plurality of third lock members accommodated in the plurality of third lock slots; and a plurality of fourth lock members accommodated in the plurality of fourth lock slots and abutting against the plurality of third lock members.

5. The lockset of claim 4, further comprising:

a first elastic member disposed in the second lock slot and abutting against the second lock member and the lock casing; and a plurality of second elastic members disposed in the plurality of fourth lock slots and abutting against the plurality of fourth lock members and the lock casing.

6. The lockset of claim 4, wherein the first lock slot is arranged side by side with the plurality of third lock slots and is located at a tail end of the lock cylinder, and the second lock slot is arranged side by side with the plurality of fourth lock slots and is located at a tail end of the lock casing.

7. The lockset of claim 4, wherein the lock casing further comprises a through hole and a cover, the through hole extends along an axial direction of the lock casing, the through hole is formed at a position on the lock casing that is different from the positions of the second and fourth lock slots, the through hole corresponds to the plurality of third lock slots and does not correspond to the first slot, and the cover covers the through hole.

8. The lockset of claim 7, wherein the lock casing further comprises a restraining member and the restraining member restrains the cover on the lock casing.

* * * * *